No. 856,657. PATENTED JUNE 11, 1907.
C. F. OBRECHT.
AUTOMOBILE TIRE.
APPLICATION FILED FEB. 9, 1907.
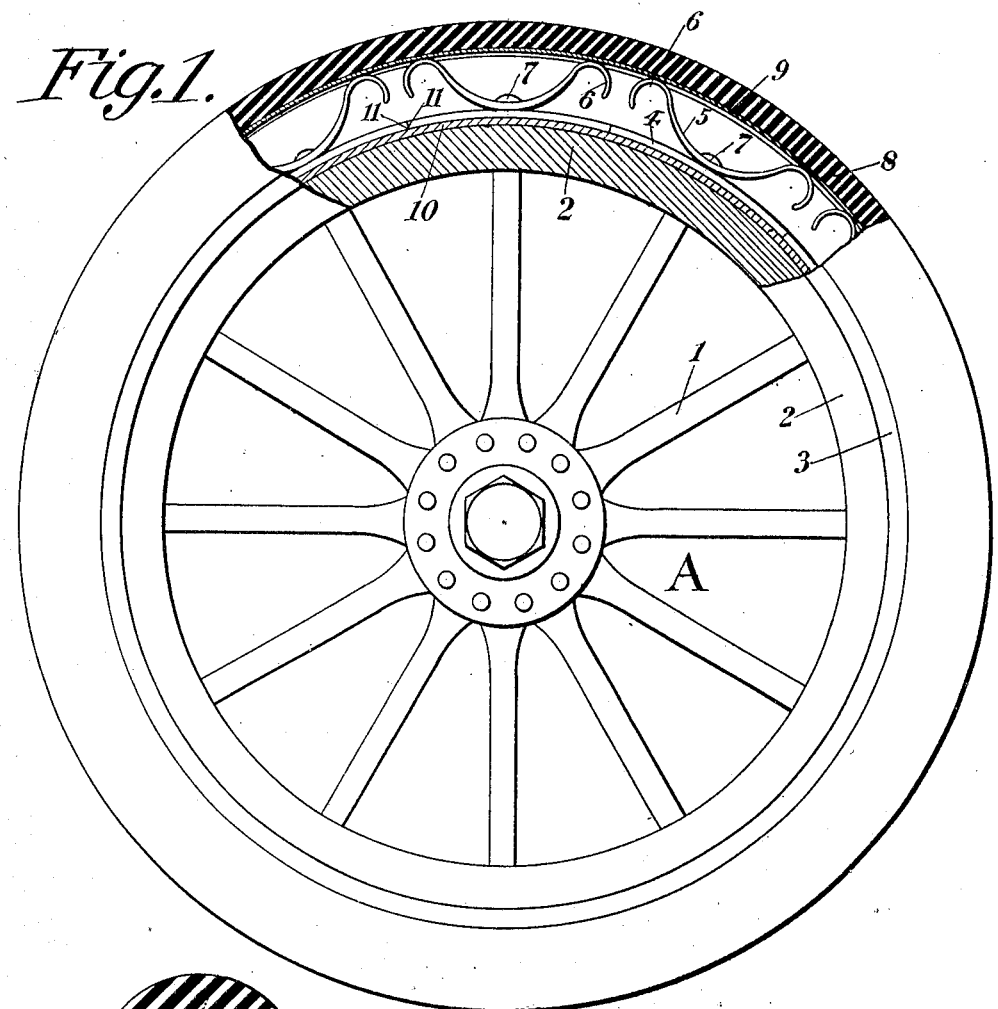
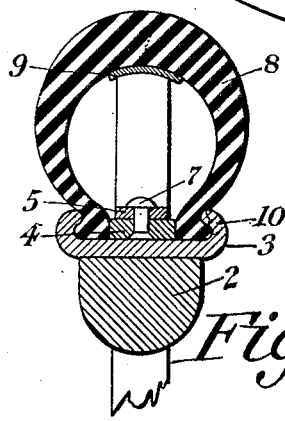
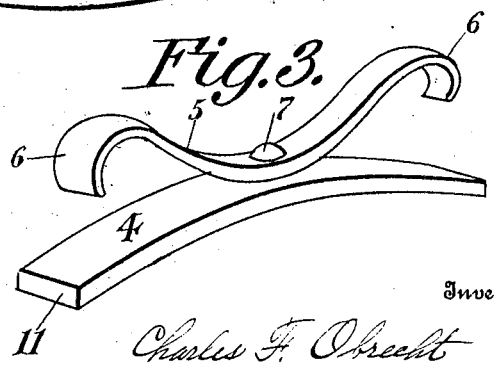

UNITED STATES PATENT OFFICE.

CHARLES F. OBRECHT, OF BALTIMORE, MARYLAND.

AUTOMOBILE-TIRE.

No. 856,657.　　　Specification of Letters Patent.　　　Patented June 11, 1907.

Application filed February 9, 1907. Serial No. 356,504.

*To all whom it may concern:*

Be it known that I, CHARLES F. OBRECHT, a citizen of the United States, residing at Baltimore city and State of Maryland, have invented certain new and useful Improvements in Automobile-Tires, of which the following is a specification.

My invention relates to an improvement in wheel tires for automobiles and the like and the object is to decrease the liability of the tires to be cut and punctured and afford at the same time a yielding compressible lateral internal support for the rubber tire or casing.

With the foregoing object in view, my invention consists in certain novel features of construction and combinations of parts, which will be hereinafter described and pointed out in the claims.

In the accompanying drawings Figure 1 is a side view of a wheel, with the parts broken away to better show the invention, Fig. 2 is a transverse section and Fig. 3 is a detail view of the spring.

A. represents a wheel, 1, the spokes; 2 is the rim of the wheel; 3 is a channel secured on the rim; 4 is a flat circumferential bent metal rod adapted to fit within the channel 3 and to conform to the shape of the rim; 5 is a semi-elliptic transversely bent spring made from a single piece of metal, the ends of which are bent downward forming a curvature 6 on each respective end, the said spring being secured to the circumferential bent rod 4 by means of the rivet 7; 8 is the rubber tire or casing and 9 is a metal strip transversely bent to conform to the curvature of the springs and fits over the several springs and between them and the rubber tire or casing 8, which fits over them and incloses them, this metal strip providing a slidable means and affording a means of resiliency to the springs, the tire or casing 8 is secured at its edges in any convenient manner within the grooves 10 of the channel 3. The ends of the rods 4 preferably engage each other at the ends thereof as shown at 11, and if necessary may be secured to the channel 3 of the rim 2 by any suitable means (not shown) it has been demonstrated by actual practice that it is not necessary to secure the springs to the channel other than in the manner as herein described.

As many of the springs are employed as may be required to afford support for the rubber tire or casing and they may be placed at suitable intervals apart, for this purpose.

From the foregoing it will be seen that a simple means is provided for supporting and sustaining the weight applied upon the rubber tire, and at the same time to all intents and purposes the tire is puncture proof and at the same time the tire is rendered elastic and resilient and responsive to compression, and strain, and quickly resumes its normal condition upon the excessive strain or pressure being removed.

Slight changes might be resorted to in the form and arrangement of the several parts described without departing from the spirit and scope of my invention, and hence I do not desire to limit myself to the exact construction as herein set forth; but Having fully described my invention, what I claim as new and desire to secure by Letters Patent, is:

The combination with a rim provided with a grooved channel secured thereon, of flat circumferentially bent metal rods, semi-elliptic transversely bent springs secured to the said rods, a transversely bent metal strip placed above the said springs thereby securing the said springs within the said channel, a rubber tire or casing fitted over the said metal strip and inclosing the said spring, the edges of the said tire or casing being secured within the grooves in the said channel substantially as described.

In testimony whereof I affix my signature in presence of two witnesses.

CHARLES F. OBRECHT.

Witnesses:
　MARY M. MAGRAW,
　E. WALTON BREWINGTON.